United States Patent
Kim et al.

(10) Patent No.: US 10,768,759 B2
(45) Date of Patent: Sep. 8, 2020

(54) DISPLAY DEVICE AND METHOD FOR DRIVING THE SAME

(71) Applicant: Samsung Display Co., Ltd., Yongin-si, Gyeonggi-do (KR)

(72) Inventors: Jin Hwan Kim, Yongin-si (KR); Mi Ae Park, Yongin-si (KR); Byeong Jin Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/186,412

(22) Filed: Nov. 9, 2018

(65) Prior Publication Data
US 2019/0179447 A1      Jun. 13, 2019

(30) Foreign Application Priority Data

Dec. 12, 2017   (KR) .......................... 10-2017-0170585

(51) Int. Cl.
*G06F 3/044*    (2006.01)
*G06F 3/041*    (2006.01)

(52) U.S. Cl.
CPC ............ *G06F 3/044* (2013.01); *G06F 3/0416* (2013.01); *G06F 2203/04102* (2013.01); *G06F 2203/04103* (2013.01); *G06F 2203/04112* (2013.01)

(58) Field of Classification Search
CPC ........... G06F 3/044; G06F 2203/04102; G06F 2203/04103; G06F 1/1652; G06F 3/0416; G06F 3/045; G06F 2203/04112; G06F 2203/04113; G09G 2380/02

USPC .............................. 178/18.05; 345/173, 174
See application file for complete search history.

(56) References Cited

U.S. PATENT DOCUMENTS

| | | | |
|---|---|---|---|
| 9,304,348 B2 | 4/2016 | Jang | |
| 9,491,279 B2 | 11/2016 | Park et al. | |
| 2015/0268770 A1* | 9/2015 | Cok | G06F 3/047 345/174 |
| 2016/0062503 A1* | 3/2016 | Lee | G01L 1/2206 345/174 |
| 2016/0109973 A1* | 4/2016 | Kim | G06F 3/041 |
| 2016/0342257 A1* | 11/2016 | Watazu | G06F 3/0414 |
| 2018/0348943 A1* | 12/2018 | Yoon | G06F 3/044 |

FOREIGN PATENT DOCUMENTS

| | | |
|---|---|---|
| KR | 10-2014-0011154 A | 1/2014 |
| KR | 10-2016-0005447 A | 1/2016 |
| KR | 10-2017-0040408 A | 4/2017 |

\* cited by examiner

*Primary Examiner* — Amr A Awad
*Assistant Examiner* — Aaron Midkiff
(74) *Attorney, Agent, or Firm* — Lewis Roca Rothgerber Christie LLP

(57) ABSTRACT

In a display device foldable along a folding axis, the display device includes: a display panel configured to display an image at a display region; and a touch unit configured to sense a touch input at the display region, and sense a folding state of the display device, wherein the touch unit includes: a plurality of first sensors arranged in a matrix on a same plane; and a second sensor overlapping the folding axis, the second sensor comprising a conductive line of which at least a portion is bent.

19 Claims, 11 Drawing Sheets

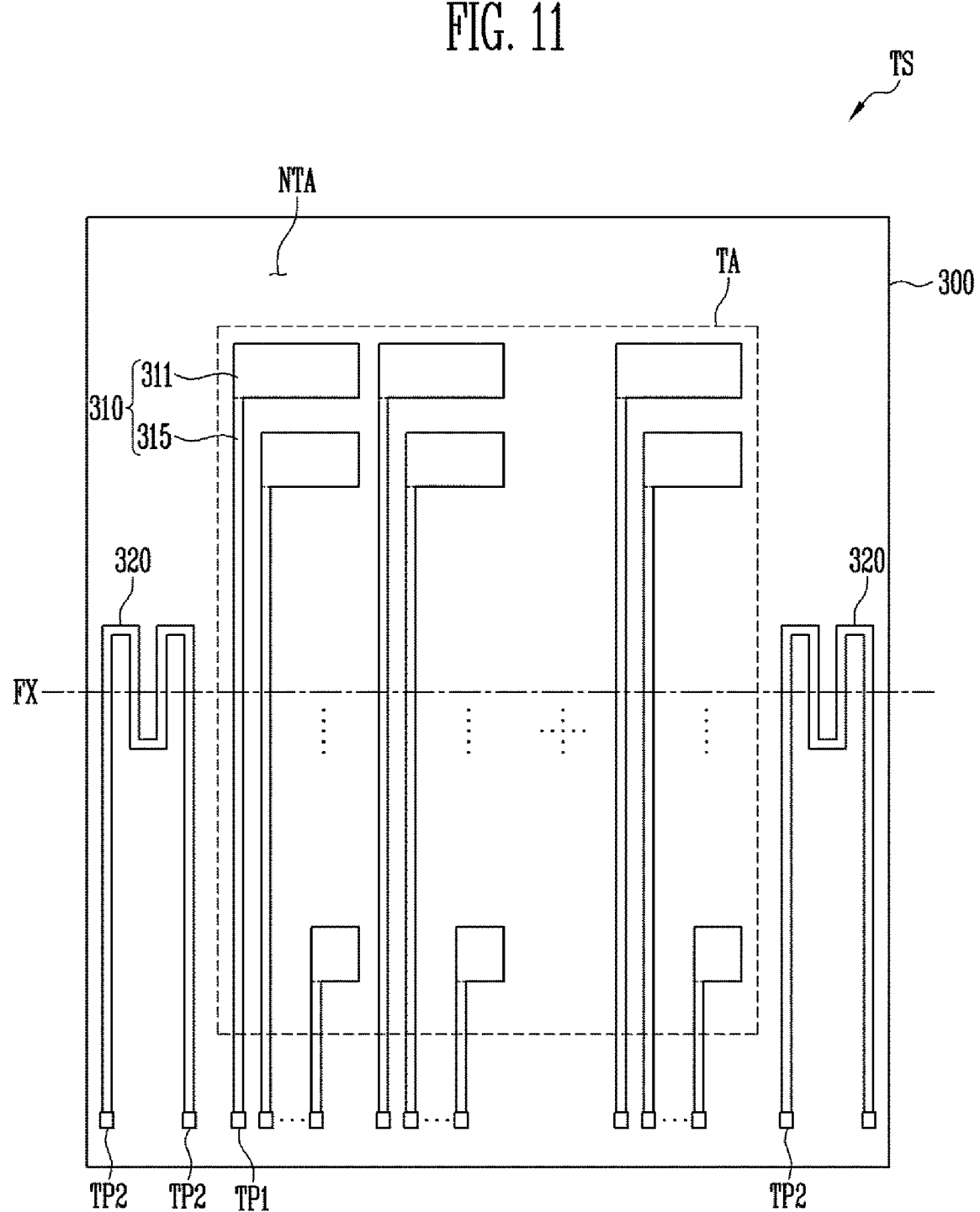

ical Property Office, the entire disclosure of which is incorporated herein by reference.

BACKGROUND

1. Field

Aspects of some example embodiments relate to a display device and a method for driving the same.

2. Related Art

As interest in information displays and demand for portable information media increase, research and commercialization has centered on display devices.

A display device may include touch sensors for receiving touch inputs of users in addition to image display functions. Accordingly, users can more conveniently use the display devices through the touch sensors.

Various functions may be provided to users of a display device, using pressures generated due to touches as well as touch positions or using flexible characteristics of display devices.

The above information discussed in this Background section is only for enhancement of understanding of the background of the described technology and therefore it may contain information that does not constitute prior art.

SUMMARY

Aspects of some example embodiments may include a display device for controlling on or off of a power source by sensing a folding state of the display device.

Aspects of some example embodiments may include a foldable display device in which a sensor for sensing a folding state of the display device is formed without adding any separate component or any separate process.

According to some example embodiments, in a display device foldable along a folding axis, the display device includes: a display panel configured to display an image through a display region; and a touch unit configured to sense a touch input to the display region, and sense a folding state of the display device, wherein the touch unit includes: a plurality of first sensors arranged in a matrix form on the same plane; and a second sensor arranged to overlap with the folding axis, the second sensor including a conductive line of which at least a portion is bent.

The display device may be divided into the display region and a non-display region surrounding the display region. The plurality of first sensors may be arranged to overlap with the display region, and the second sensor may be arranged to overlap with the non-display region.

Each of the plurality of first sensors may include: a sensing electrode; and a signal line connected to the sensing electrode. The sensing electrode and the signal line may be formed on the same plane.

The touch unit may further include a first pad connected to the signal line.

The second sensor may be formed on the same plane as the first pad.

The second sensor may be formed on a plane different from that of the plurality of first sensors.

The resistance of the second may be larger than that of the plurality of first sensors.

The touch unit may further include a sensor controller configured to receive a touch input signal output from the plurality of first sensors, and receive a folding sensing signal output from the second sensor. The touch input signal may include a change in self-capacitance of the sensing electrode, and the folding sensing signal may include a change in resistance of the second sensor.

The sensing electrode may have a mesh shape.

The display device may further include a display driver configured to control display of an image on the display panel, corresponding to a signal output from the second sensor.

The display region may include a first display region and a second display region, which are distinguished by the folding axis. When the display device is in an in-folding state, the display driver may control the first display region and the second display region to be non-activated.

When the display device is in an out-folding state, the display driver may control at least one of the first display region and the second display region to be non-activated.

Two second sensors may be provided in the touch unit. The display region may be located between the two second sensors.

According to an aspect of the present disclosure, there is provided a method for driving a display device foldable along a folding axis, the method including: displaying an image on a display panel; acquiring a folding sensing signal from a second sensor provided in a touch unit; and controlling display of an image on the display panel with reference to the folding sensing signal, wherein the second sensor includes a conductive line of which at least a portion is bent, wherein the folding sensing signal includes a change in resistance of the second sensor.

The display panel may display the image through a plurality of display regions distinguished by the folding axis, and the display of the image on the display panel may be controlled such that the plurality of display regions are non-activated when the display device is in an in-folding state.

The display of the image on the display panel may be controlled such that at least one display region among the plurality of display regions are non-activated when the display device is in an out-folding state.

The touch unit may include: a plurality of sensing electrodes arranged in a matrix form on the same plane; a plurality of signal lines respectively connected to the plurality of sensing electrodes; and a plurality of pads respectively connected to the plurality of signal lines. The plurality of sensing electrodes may output a touch input signal to which a change in self-capacitance is reflected.

The plurality of sensing electrodes and the plurality of signal lines may be formed on the same plane.

The plurality of pads may be formed in a plane different from that of the plurality of sensing electrode, and the second sensor and the plurality of pads may be formed on the same plane.

BRIEF DESCRIPTION OF THE DRAWINGS

Aspects of some example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 11 is a view illustrating another embodiment of the touch unit shown in FIG. 2.

DETAILED DESCRIPTION

Figure 1:
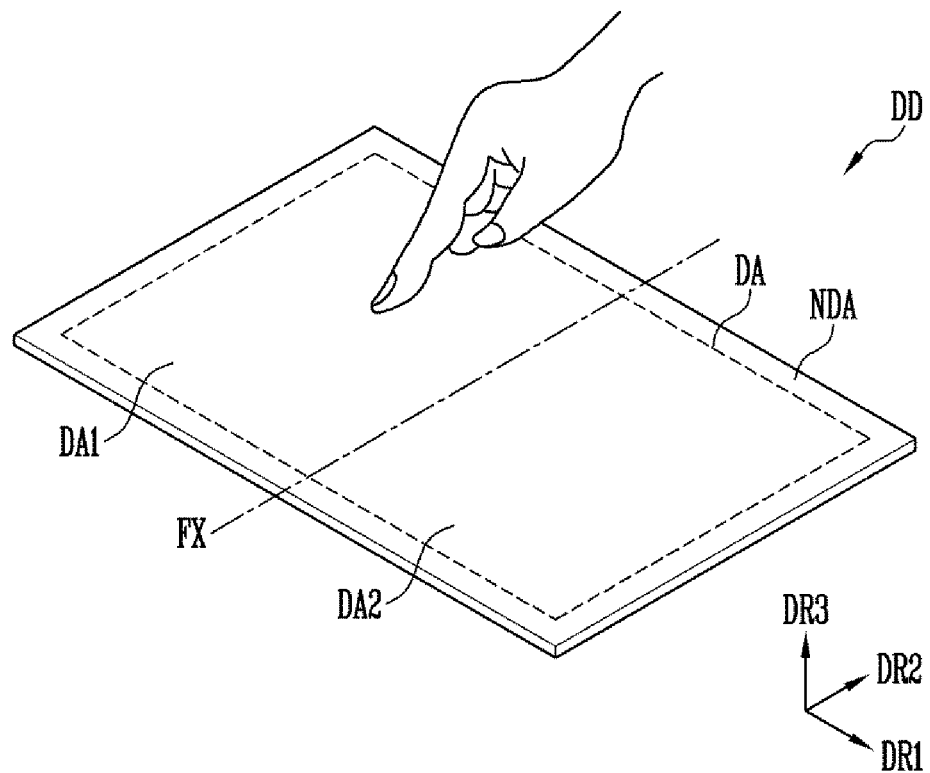
FIGS. 1 and 2 are views illustrating a display device according to some example embodiments of the present disclosure.

Various aspects and features of some example embodiments of the present invention, and the way of attaining them, will become apparent with reference to embodiments described below in conjunction with the accompanying drawings. However, embodiments of the present disclosure is not limited to the example embodiments but may be implemented into different forms. These embodiments are provided only for illustrative purposes and for full understanding of the scope of the present disclosure by those skilled in the art. In the entire specification, when an element is referred to as being "connected" or "coupled" to another element, it can be directly connected or coupled to the another element or be indirectly connected or coupled to the another element with one or more intervening elements interposed therebetween. It should note that in giving reference numerals to elements of each drawing, like reference numerals refer to like elements even though like elements are shown in different drawings.

Hereinafter, a display device, a method for driving the same, and a method for manufacturing the same will be described with reference to exemplary embodiments in conjunction with the accompanying drawings.

Figure 2:
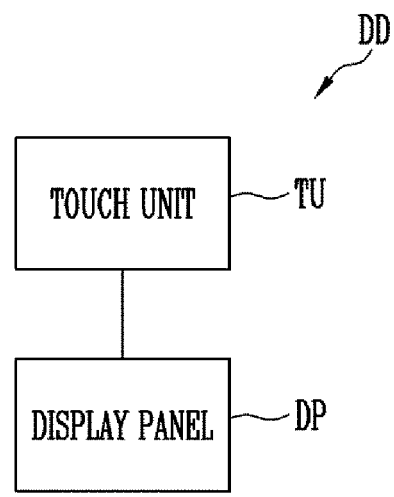

FIGS. 1 and 2 are views illustrating a display device according to some example embodiments of the present disclosure. In particular, FIGS. 1 and 2 illustrate a display device that is in a state in which it is not folded.

Referring to FIG. 1, the display device DD includes a display surface on which an image is displayed, and the display surface may be parallel to a plane defined by a first direction DR1 and a second direction DR2. The normal direction of the display surface may be a third direction DR3, and the third direction DR3 may indicate a thickness direction of the display device DD.

Front and rear surfaces of the display device DD and components included in the display device DD may be distinguished by the third direction DR3. However, directions indicated by the directions DR1, DR2, and DR3 are relative concepts, and may be changed into other directions.

As shown in FIG. 1, the display device DD may include a plurality of regions distinguished on the display surface. For example, the display device DD may be divided into a display region DA and a non-display region NDA according to whether an image is to be displayed. The display region DA may be a region in which an image is displayed, and the non-display region NDA may be a region in which any image is not displayed, as a peripheral region.

The display region DA may include a first display region DA1 and a second display region DA2. The first display region DA1 and the second display region DA2 may be distinguished by a folding axis FX.

Referring to FIG. 2, the display device DD may include a display panel DP and a touch unit TU.

The display panel DP may generate an image to be displayed in the display region DA. Although not shown in the drawing, the display panel DP may include a plurality of data lines, a plurality of scan lines, and a plurality of pixels each connected to a corresponding data line among the data lines and a corresponding scan line among the scan lines.

The plurality of pixels are arranged in a matrix form on a plane. Each of the pixels may generate light, corresponding to a scan signal transferred from a corresponding scan line and a data signal transferred from a corresponding data line. The lights generated by the respective pixels may constitute an image.

The touch unit TU may function to sense a touch of a user, which is input to a touch region. Here, the touch region may be the same as the display region DA.

The user of the display device DD may input a touch signal and simultaneously receive information provided through an image displayed in the display device DD.

Figure 3:
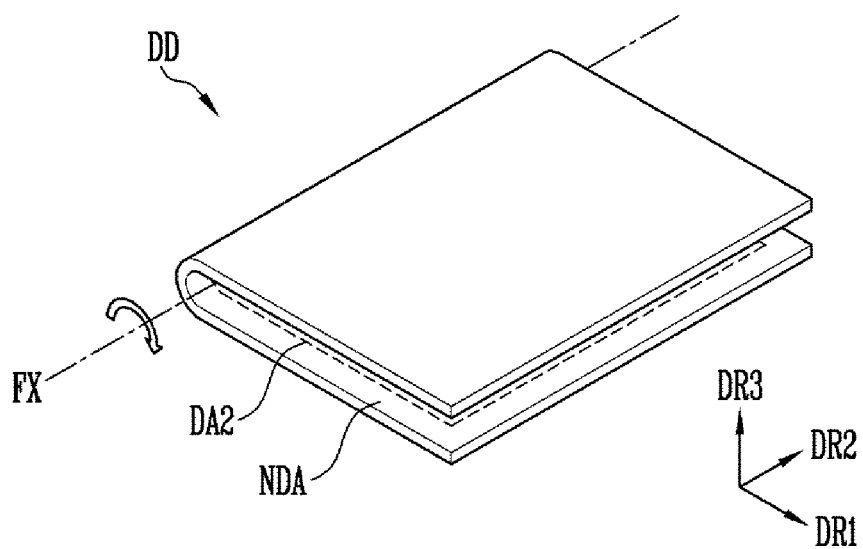
FIGS. 3 and 4 illustrate a state in which the display device shown in FIG. 1 is folded.
Figure 4:
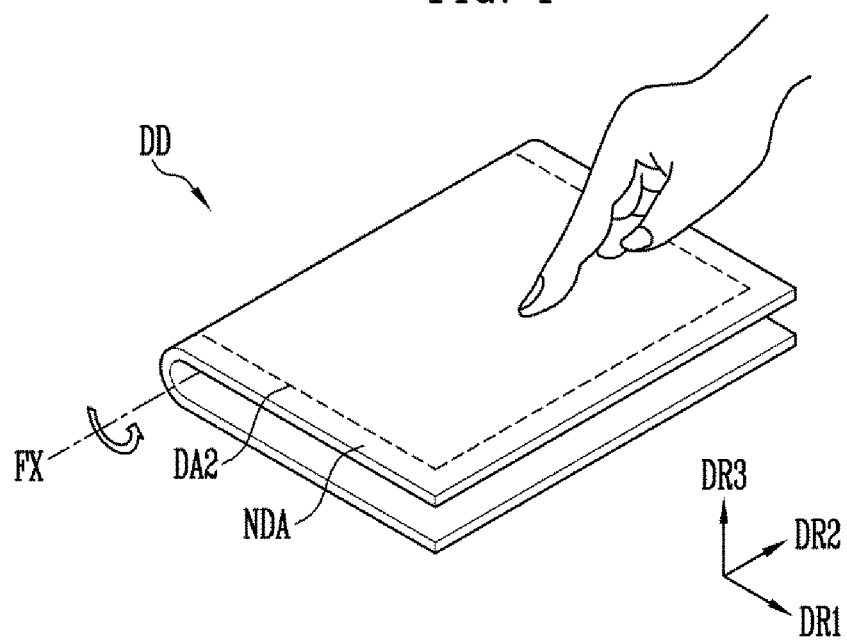

FIGS. 3 and 4 illustrate a state in which the display device shown in FIG. 1 is folded. In particular, FIG. 3 illustrates the display device that is in an in-folding state, and FIG. 4 illustrates the display device that is in an out-folding state.

Referring to FIGS. 3 and 4, the display device DD may be folded along the folding axis FX.

As shown in FIG. 3, the display device DD according to some example embodiments of the present disclosure may be folded to be in an in-folding state. Here, the in-folding state may refer to a state in which the display region DA is folded to be located at the inside of the folded display device DD. If the display device DD is in the in-folding state, the user is in a state in which the user cannot view the display region DA.

Next, as shown in FIG. 4, the display device DD according to some example embodiments of the present disclosure may be folded to be in an out-folding state. Here, the out-folding state may refer to a state in which the display region DA is folded to be located at the outside of the folded display device DD. When the display device DD is in the out-folding state, the user can view at least a portion (e.g., the second display region DA2) of the display region DA.

Meanwhile, a case where the folding axis FX is parallel to the second direction DR2 is illustrated in FIGS. 1 to 4. However, the present disclosure is not limited thereto, and the extending direction of the folding axis FX may be variously changed.

Figure 5:
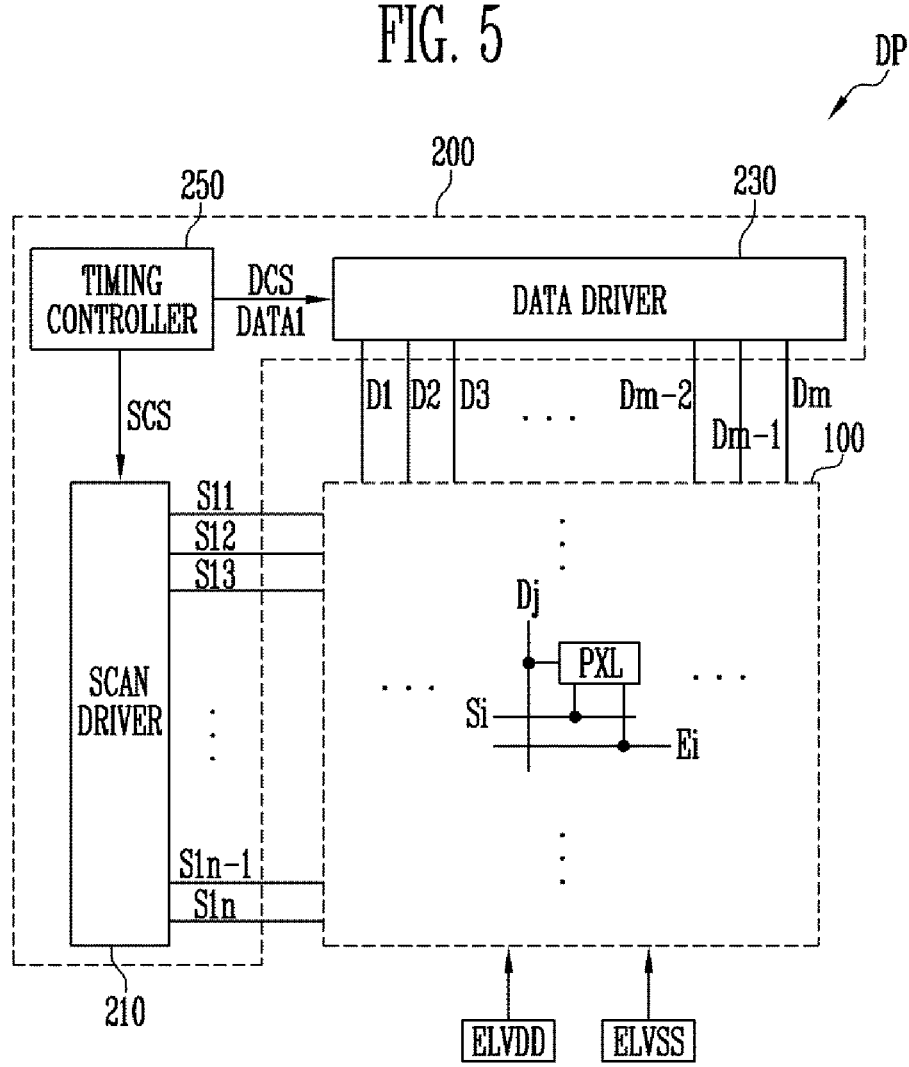
FIG. 5 is a view illustrating a configuration of a display panel shown in FIG. 2.

FIG. 5 is a view illustrating a configuration of the display panel shown in FIG. 2.

Referring to FIG. 5, the display panel DP according to some example embodiments of the present disclosure a pixel unit 100 and a display driver 200. The display driver 200 may include a scan driver 210, a data driver 230, and a timing controller 250.

The display driver 200 may control driving of the pixel unit 100. The pixel unit 100 may be activated under the control of the display driver 200 to display an image, or be non-activated under the control of the display driver 200 not to display any image.

The timing controller 250 may control display of an image in the display region DA, and may receive a plurality of image signals from the outside, and convert the image signals into image data suitable for an operation mode of the display panel DP.

Also, the timing controller 250 may receive various types of control signals such as a vertical synchronization signal, a horizontal synchronization signal, a main clock signal, and a data enable signal to generate a scan driving control signal SCS and a data driving control signal DCS.

Also, the timing controller 250 may control the display of the image in the display region, corresponding to a folding sensing signal indicating a folding state of the display device DD.

For example, when the display device is in the in-folding state, the timing controller 250 may control the whole of the display region DA to be non-activated. That is, if the display device DD is in the in-folding state, any image may not be displayed in the display region DA.

Alternatively, when the display device DD is in the out-folding state, the timing controller 250 may control at least one of the first display region DA1 and the second display region DA2 to be non-activated. That is, if the display device DD is in the out-folding state, an image may be displayed in only any one of the first display region DA1 and the second display region DA2. Alternatively, in some cases, both of the first display region DA1 and the second display region DA2 may be non-activated.

The scan driver 210 may supply a scan signal to scan lines S11 to S1$n$ in response to the scan driving control signal SCS. For example, the scan driver 210 may sequentially supply the scan signal to the scan lines S11 to S1$n$.

The data driver 230 may supply a data signal to data lines D1 to Dm in response to the data driving control signal DCS. The data signal supplied to the data lines D1 to Dm may be supplied to pixels PXL selected by the scan signal. The scan driver 210 may be mounted on a substrate through a thin film process.

The pixel unit 100 may include a plurality of pixels PXL connected to the data lines D1 to Dm and the scan lines S11 to S1$n$. Here, the pixel unit 100 may correspond to the display region DA of the display device DD.

The pixels PXL may be supplied with a first power source ELVDD and a second power source ELVSS.

Each of the pixels PXL may be selected when a scan signal is supplied to a scan line S11 to S1$n$ connected thereto to be supplied with a data signal from a data line D1 to Dm. The pixel PXL supplied with the data signal may control an amount of current flowing from the first power source ELVDD to the second power source ELVSS via a light emitting device, corresponding to the data signal.

At this time, the light emitting device may generate light with a predetermined luminance corresponding to the amount of current. Additionally, the first power source ELVDD may be set to a voltage higher than that of the second power source ELVSS.

Meanwhile, a case where the pixel PXL is connected to one scan line Si and one data line Dj is illustrated in FIG. 5, but the present disclosure is not limited thereto. In other words, the number of scan lines S11 to S1$n$ connected to the pixel PXL, corresponding to the circuit structure of the pixel PXL, may be plural numbers.

In addition, although only the scan driver 210 is illustrated in FIG. 5, emission control lines and an emission driver, which are connected to the pixels PXL, may be further included according to the structure of the pixel PXL.

Figure 6A:
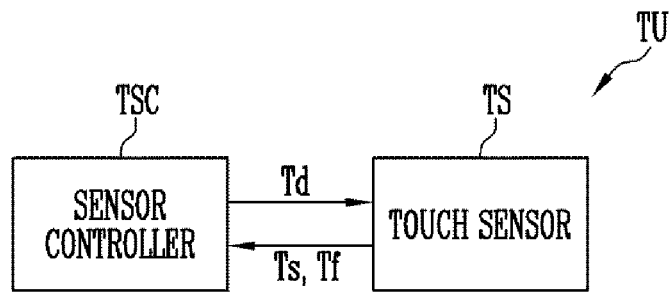
FIG. 6A is a view illustrating a configuration of a touch unit shown in FIG. 2.
Figure 6B:
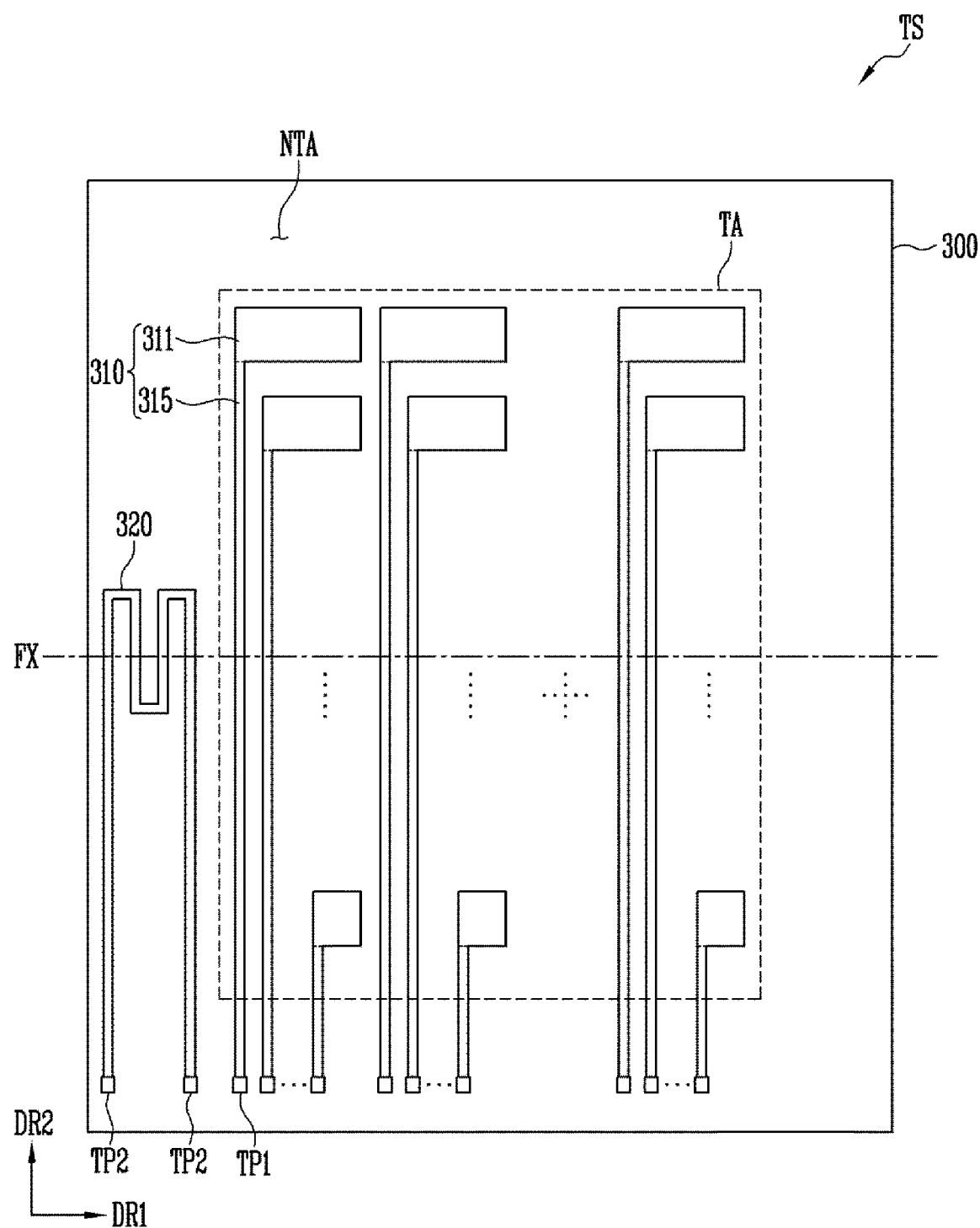
FIG. 6B is a view illustrating a configuration of a touch sensor shown in FIG. 6A.

FIG. 6A is a view illustrating a configuration of the touch unit shown in FIG. 2. FIG. 6B is a view illustrating a configuration of a touch sensor shown in FIG. 6A.

Referring to FIG. 6A, the touch unit TU may include a touch sensor TS and a sensor controller TSC.

The touch sensor TS may include a sensor for sensing a touch input of a user and a sensor for sensing whether the display device DD is in a state in which it is folded.

The sensor controller TSC may supply, to the touch sensor TS, driving signals Td for driving the touch sensor TS.

Also, the sensor controller TSC may detect a position at which a touch is input, using touch input signals TS output from the touch sensor TS.

Also, the sensor controller TSC may determine whether the display device DD is in the state in which it is folded, using a folding sensing signal Tf output from the touch sensor TS.

Referring to FIG. 6B, the touch sensor TS may include a substrate 300, a plurality of first sensors 310, and a second sensor 320.

The substrate 300 may be made of an insulative material such as glass or resin. Also, the substrate 300 may be made of a material having flexibility to be bendable or foldable, and have a single- or multi-layered structure.

For example, the substrate 300 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

Meanwhile, a case where the substrate 300 is a separate component is illustrated in FIG. 6B, but the present disclosure is not limited thereto. That is, an encapsulation layer of the display panel DP may serve as the substrate 300 of the touch sensor TS. In this case, the first sensors 310 and the second sensor 320 may be formed on the encapsulation layer of the display panel DP.

The substrate 300 may be divided into a touch active region TA and a touch non-active region NTA. The touch active region TA may be a region overlapping with the display region DA.

The touch non-active region NTA may be a peripheral region surrounding the touch active region TA. The touch non-active region NTA may be a region overlapping with the non-display region NDA.

The plurality of first sensors 310 may be formed on the substrate 300, and be located in the touch active region TA.

The plurality of first sensors 310 according to the embodiment of the present disclosure may be arranged in a single layer structure.

For example, as shown in FIG. 6B, the first sensors 310 are arranged on a plane defined by a first direction DR1 and a second direction DR2, and the form in which the first sensors 310 are arranged may be a matrix form in which the first sensors 310 are arranged in the first direction DR1, and a plurality of sensor rows on which the first sensors 310 are arranged along the first direction DR1 are provided along the second direction DR2.

Each of the plurality of first sensors 310 may include a first sensing electrode 311 and a signal line 315 for transferring a touch input signal Ts acquired by the first sensing electrode 311 to the sensor controller TSC.

Here, the first sensing electrode 311 is used to sense a touch input to the display device DD, using a change in self-capacitance. In particular, the first sensing electrode 311 may be used to sense a change in self-capacitance.

The first sensing electrodes 311 may include a conductive material. For example, the conductive material may include metals, alloys thereof, a conductive polymer, a conductive metal oxide, and the like.

In an embodiment of the present disclosure, examples of the metals may be copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, and the like. Examples of the conductive polymer may be polythiophene-based, polypyrrole-based, polyaniline-based, polyacetylene-based, and polyphenylene-based compounds, mixtures thereof, and the like. In particular, a PEDOT/PSS compound among the polythiophene-based compounds may be used as the conductive polymer.

Examples of the conductive metal oxide may be indium tin oxide (ITO), indium zinc oxide (IZO), antimony zinc oxide (AZO), indium tin zinc oxide (ITZO), zinc oxide (ZnO), tin oxide ($SnO_2$), and the like.

In an embodiment of the present disclosure, the first sensing electrode 311 may be provided in a single layer or a multi-layer.

Meanwhile, a case where the first sensing electrode has a quadrangular shape is illustrated in FIG. 6B, but the present disclosure is not limited thereto. That is, the shape of the first sensing electrode 311 may be variously modified.

The signal lines 315 may be formed of a material capable of forming the first sensing electrode 311, and be formed of the same material as the first sensing electrode 311. Here, because the signal lines 315 are connected to the respective first sensing electrodes 311, the signal lines 315 may be provided as many as the number of first sensing electrodes 311 provided in the touch sensor TS.

A change in capacitance of the first sensing electrode 311 may be reflected to a signal transferred through the signal line 315.

Each of the signal lines 315 may be connected to a first pad TP1. The first pads TP1 may be provided in the touch non-active region NTA, and be provided at an edge of the touch sensor TS.

The first pads TP1 may be a passage through which the sensor controller TSC and the first sensing electrodes 311 are electrically connected to each other. The first sensing electrodes 311 may receive a driving signal applied from the sensor controller TSC through the first pads TP1, or provide the touch input signal Ts to the sensor controller TSC through the first pads TP1.

The first pads TP1 may include a conductive material. For example, the conductive material may include metals, alloys thereof, and the like.

In an embodiment of the present disclosure, examples of the metals may be copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, and the like.

The second sensor 320 may be formed on the substrate 300, and be located in the touch non-active region NTA.

The second sensor 320 may be a conductive line of which at least a portion is bent to have a pattern (e.g., a predetermined pattern). For example, the bent portion of the second sensor 320 may be arranged to overlap with the folding axis FX. Therefore, if the display device DD is folded, the bent portion of the second sensor 320 may also be folded.

If an external force is applied to the second sensor 320 having a bent shape as shown in FIG. 6B, the length and sectional area of the second sensor 320, that is, the conductive line are changed.

For example, if the display device DD is folded, the length of the second sensor 320 is lengthened and the sectional area of the second sensor 320 is decreased. Therefore, the resistance of the second sensor 320 is increased.

That is, according to some example embodiments of the present disclosure, the second sensor 320 serves as a strain gauge.

The sensor controller TSC may determine whether the display device DD is in a state in which it is folded or a state in which it is not folded, based on a change in resistance of the second sensor 320, which is reflected to the folding sensing signal Tf.

Also, the sensor controller TSC may determine whether the display device is in the in-folding state or the out-folding state.

Second pads TP2 may be connected to both ends of the second sensor 320. The second pads TP2 may be provided in the touch non-active region NTA, and be provided at an edge of the touch sensor TS.

The second pads TP2 may be passages through which the sensor controller TSC and the second sensor 320 are electrically connected to each other. The second sensor 320 may receive the driving signal Td applied from the sensor controller TSC through the second pads TP2, or provide the folding sensing signal Tf to the sensor controller TSC through the second pads TP2. Here, a change in resistance of the second sensor 320 may be reflected to the folding sensing signal Tf.

The second pad TP2 may be formed of a material capable of forming the first pad TP1, and be formed of the same material as the first pad TP1.

In addition, the second sensor 320 may be formed of a material capable of forming the first pad TP1, and be formed of the same material as the first pad TP1.

That is, the second sensor 320 may be formed of the same material as the first pad TP1 and the second pad TP2, and be simultaneously formed with the first pad TP1 and the second pad TP2.

A circuit board may be connected to the first pads TP1 and the second pads TP2. The circuit board may be a flexible printed circuit board using a flexible insulating substrate. The sensor controller TSC may be provided on the circuit board.

Hereinafter, a manufacturing method of the touch unit TU according to some example embodiments of the present disclosure will be described with reference to FIGS. 7A to 10C.

FIGS. 7A to 10C are views illustrating a manufacturing process of the touch unit according to some example embodiments of the present disclosure.

Figure 7A:
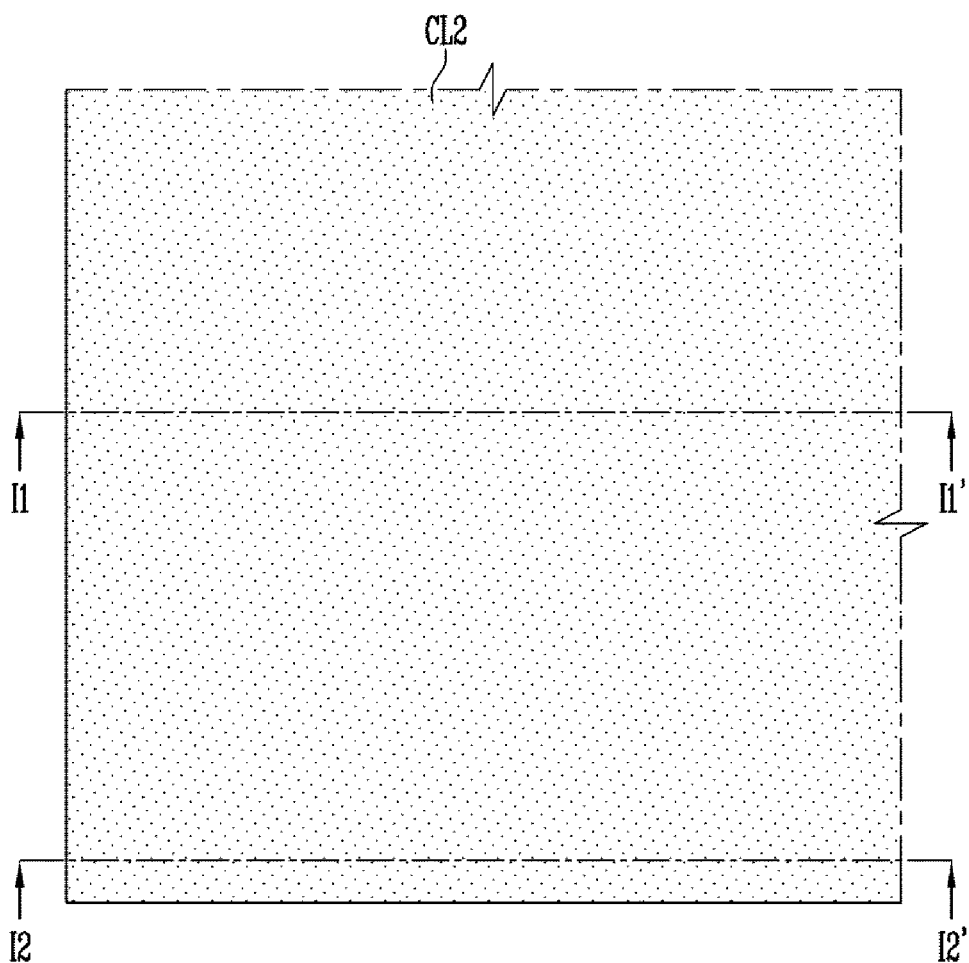
FIGS. 7A to 10C are views illustrating a manufacturing process of the touch unit according to some example embodiments of the present disclosure.
Figure 7B:
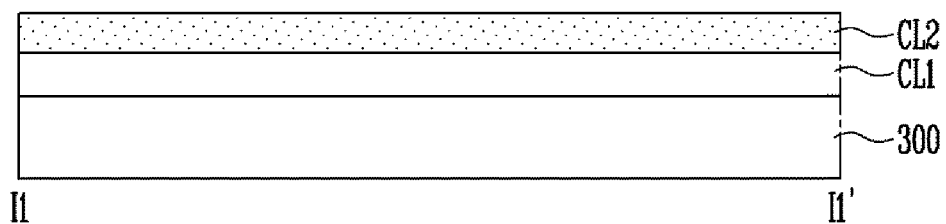
Figure 7C:
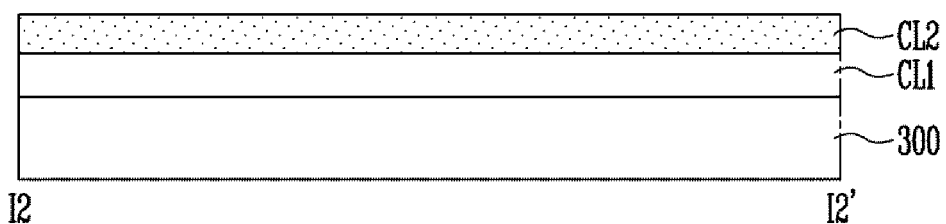

Referring to FIG. 7A to 7C, first, a first conductive layer CL1 and a second conductive layer CL2 are sequentially formed on a substrate 300. Here, FIG. 7A is a plan view illustrating a portion of the substrate 300 on which the first conductive layer CL1 and the second conductive layer CL2 are formed, FIG. 7B is a sectional view taken along line I1-I1' of FIG. 7A, and FIG. 7C is a sectional view taken along line I2-I2' of FIG. 7A.

The first conductive layer CL1 may include a transparent conductive metal oxide such as indium tin oxide (ITO), indium zinc oxide (IZO), antimony zinc oxide (AZO), indium tin zinc oxide (ITZO), zinc oxide (ZnO), or tin oxide ($SnO_2$). Alternatively, the first conductive layer CL1 may include silver nano wire, carbon nano tube, graphene, etc.

The second conductive layer CL2 may include metals such as copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead, or alloys thereof.

Here, the resistance of a conductive material forming the second conductive layer CL2 may be larger than that of a conductive material forming the first conductive layer CL1.

Figure 8A:
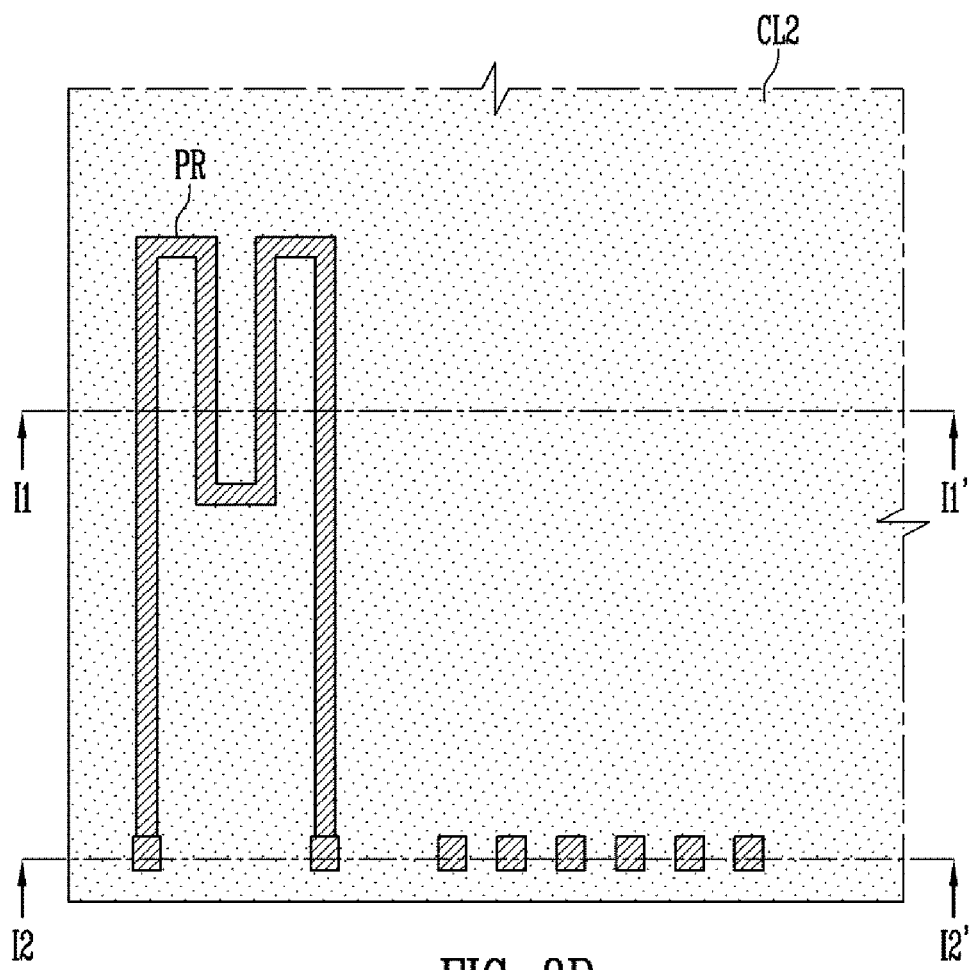
Figure 8B:
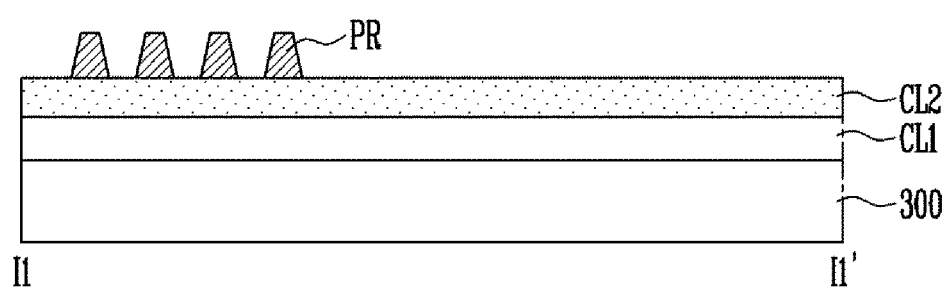
Figure 8C:
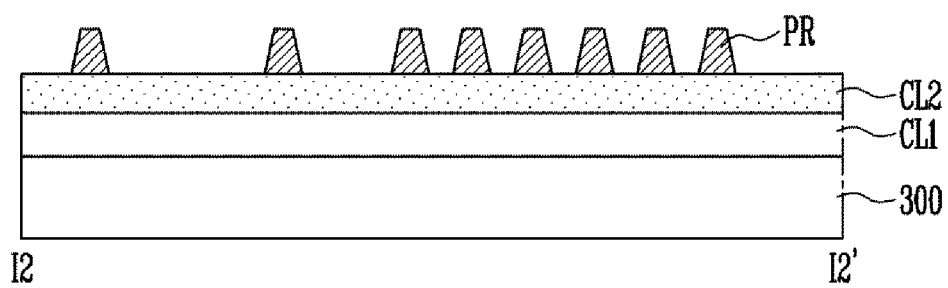

Next, after a photoresist PR is applied onto the second conductive layer CL2, the photoresist PR may be patterned as shown in FIGS. 8A to 8C, using a photo mask corresponding to the shape of a second sensor 320 and pads TP1 and TP2. Here, FIG. 8A is a plan view illustrating a portion of the substrate 300 on which the patterned photoresist PR is formed, FIG. 8B is a sectional view taken along line I1-I1' of FIG. 8A, and FIG. 8C is a sectional view taken along line I2-I2' of FIG. 8A.

Figure 9A:
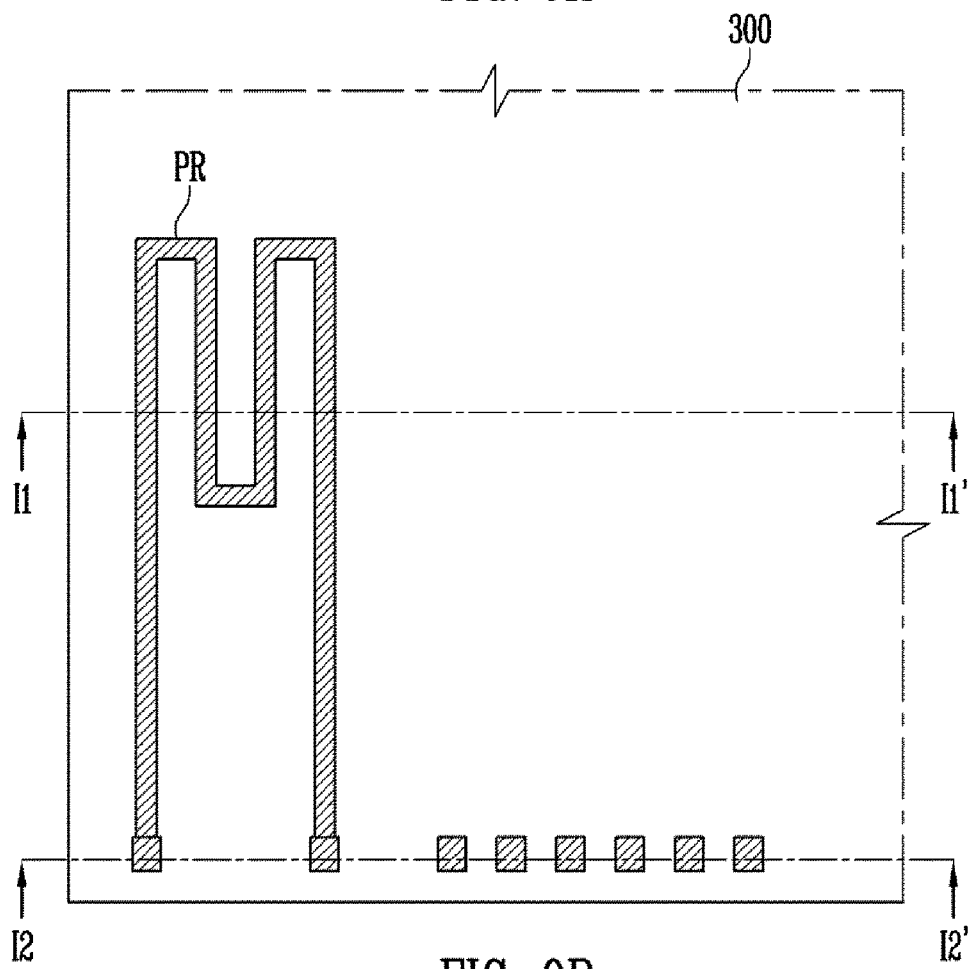
Figure 9B:
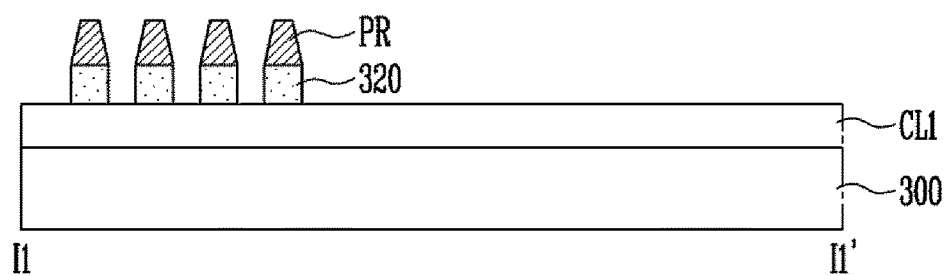
Figure 9C:
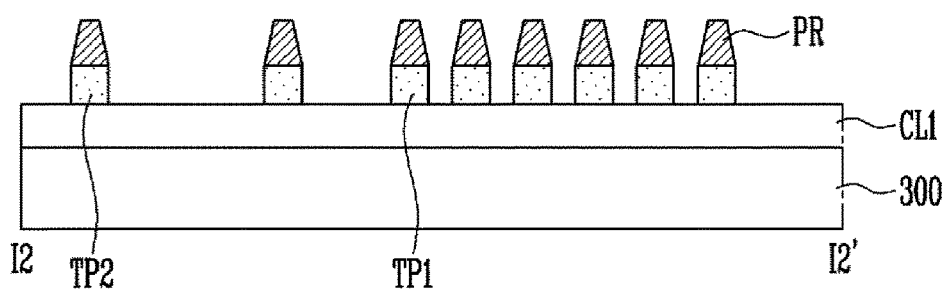

Next, the second conductive layer CL2 may be patterned as shown in FIGS. 9A to 9C through a process such as etching. Here, FIG. 9 is a plan view illustrating a portion of the substrate 300 including the patterned second conductive layer CL2, FIG. 9B is a sectional view taken along the line I1-I1' of FIG. 9A, and FIG. 9C is a sectional view taken along the line I2-I2' of FIG. 9A.

Referring to FIGS. 9B and 9C, as the second conductive layer CL2 is patterned, the second sensor 320 and the pads TP1 and TP2 may be formed. In addition, since the second conductive layer CL2 is removed in the other region except the region in which the second sensor 320 and the pads TP1 and TP2 are formed, the first conductive layer CL1 may be in a state in which it is exposed.

Next, after a photoresist PR is applied onto the first conductive layer CL1, the photoresist PR may be patterned using a photo mask corresponding to the shape of first sensing electrodes 311 and signal lines 315.

Figure 10A:
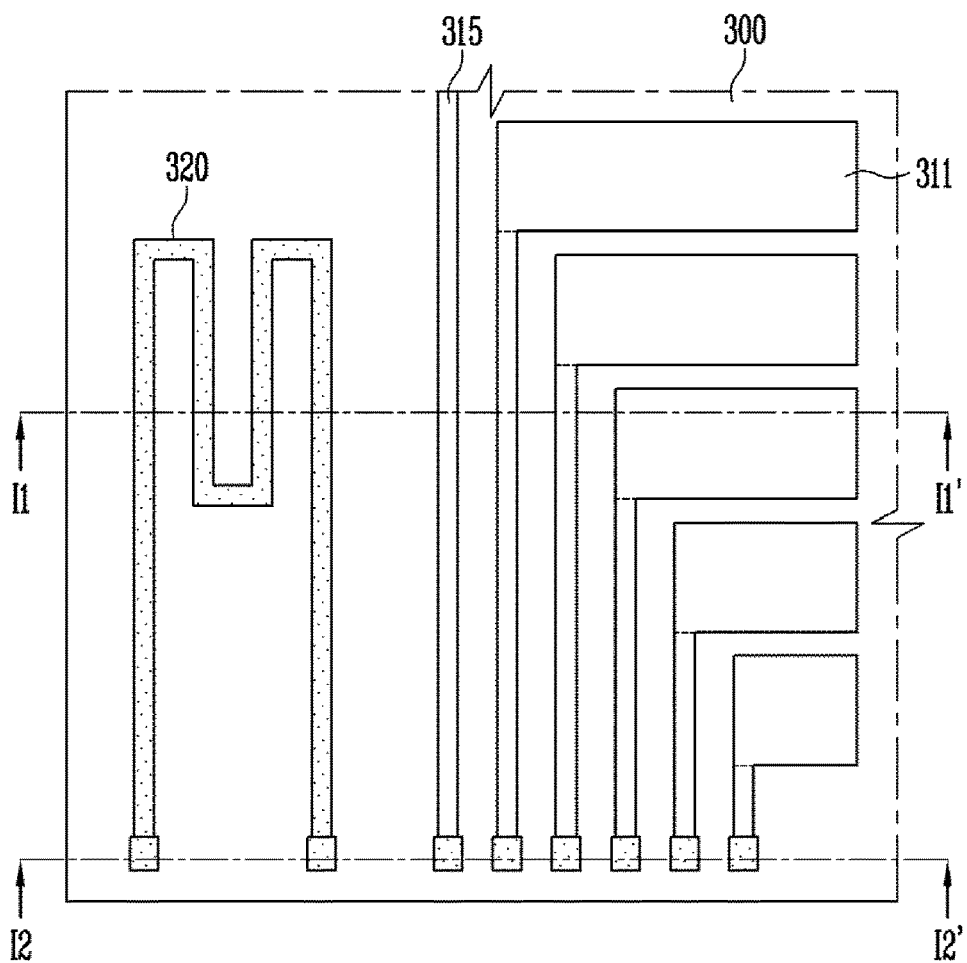
Figure 10B:
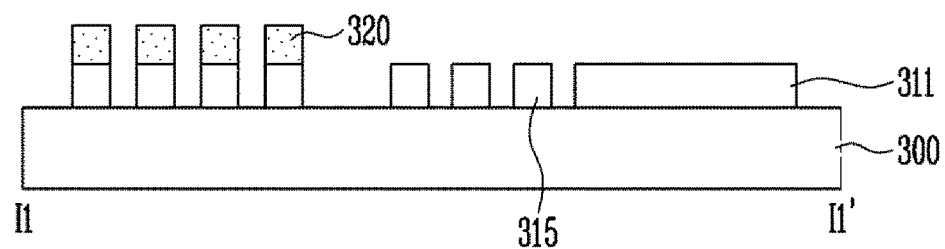
Figure 10C:
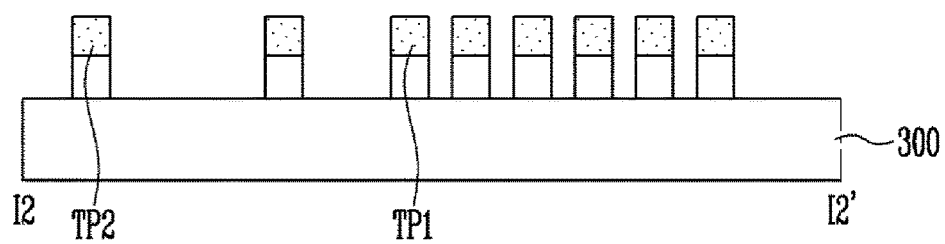

After this, the first conductive layer CL1 may be patterned as shown in FIG. 10C through a process such as etching, and the photoresist PR remaining on the substrate 300 may be removed.

The patterned first conductive layer CL1 may be configured with the first sensing electrodes 311 and the signal lines 315. In addition, a portion of the patterned first conductive layer CL1 may be located on the bottom of the second sensor 320 and the pads TP1 and TP2.

Finally, an insulating layer may be formed to cover a first sensor 310 and the second sensor 320. However, the insulating layer may be formed in only the other region except the region in which the first pads TP1 and the second pads TP2 are located, so that the first pads TP1 and the second pads TP2 can be electrically connected to a separate circuit board.

FIG. 11 is a view illustrating another embodiment of the touch unit shown in FIG. 2. In FIG. 11, portions different from those of the above-described embodiment will be mainly described, and descriptions of some portions overlapping with those of the above-described embodiment will be omitted. Accordingly, hereinafter, second sensors 320 will be mainly described.

Referring to FIG. 11, the touch unit TU may include second sensors 320, and the second sensors 320 may be located at both sides of the touch active region TA.

The sensor controller TSC may determine whether the display device DD has been folded, using a folding sensing signal output from any one second sensor 320 and a folding sensing signal output from the other second sensor 320.

When the second touch sensors 320 are located at both sides of the touch unit TU as shown in FIG. 11, it is possible to more accurately determine whether the display device DD has been folded.

In FIGS. 1 to 11, it is illustrated that the display device DD is folded along one folding axis FX, but the present disclosure is not limited thereto. For example, the display device DD may be folded twice or more.

Figure 12A:
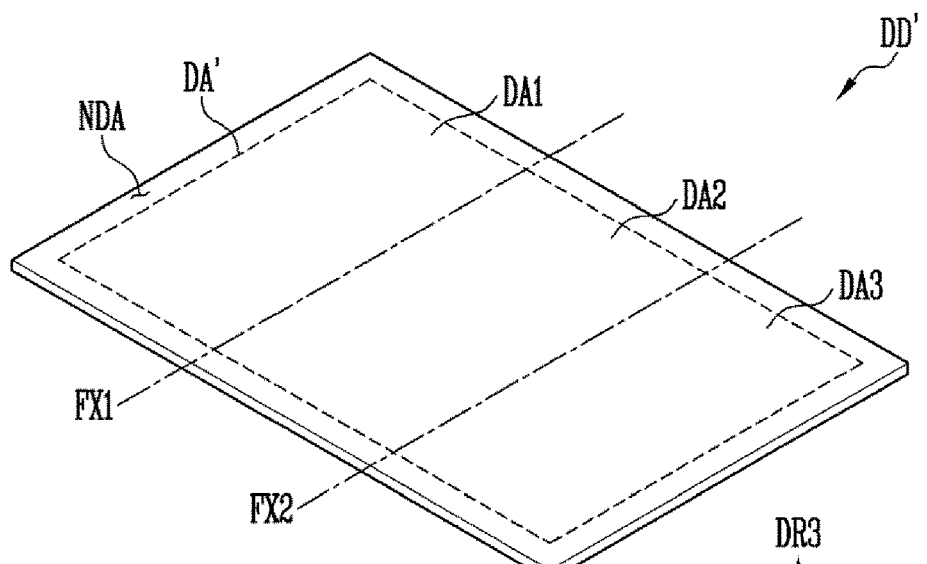
FIGS. 12A to 12C are views illustrating a display device according to some example embodiments of the present disclosure.
Figure 12B:
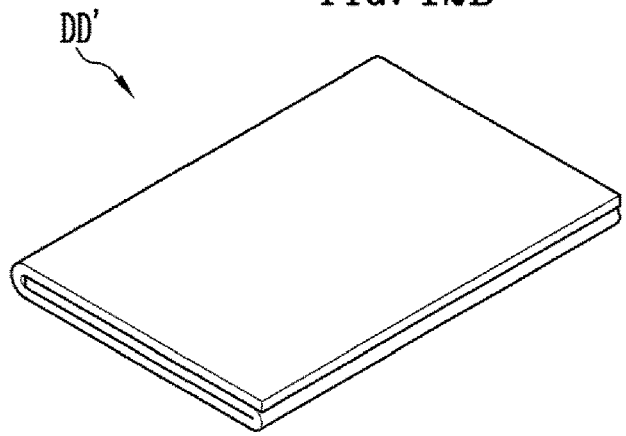
Figure 12C:
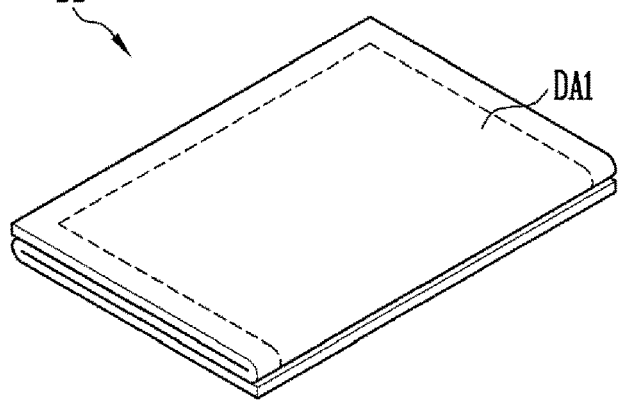

FIGS. 12A to 12C are views illustrating a display device according to some example embodiments of the present disclosure. In FIGS. 12A to 12C, portions different from those of the above-described embodiment will be mainly described, and descriptions of portions overlapping with those of the above-described embodiment will be omitted. Accordingly, hereinafter, folding axes FX1 and FX2 will be mainly described.

Here, FIG. 12A illustrates a state in which the display device DD' is not folded, FIG. 12B illustrates the display device that is in an in-folding state, and FIG. 12C illustrates the display device that is in an out-folding state.

Referring to FIG. 12A, a display region DA' may include a first display region DA1, a second display region DA2, and a third display region DA3, and the first to third display regions DA1 to DA3 may be distinguished by a first folding axis FX1 and a second folding axis FX2.

The first display region DA1, the second display region DA2, and the third display region DA3 may have the same area, but the present disclosure is not limited thereto. In addition, the first folding axis FX1 and the second folding axis FX2 may be parallel to each other, but the present disclosure is not limited thereto.

As shown in FIG. 12B, the display device DD' may be folded to be in the in-folding state. Here, the in-folding state may refer to a state in which the display region DA' is folded to be located at the inside of the folded display device DD'. If the display device DD' is in the in-folding state, a user is in a state in which the user cannot view the display region DA'.

In this case, the first to third display regions DA1, DA2, and DA3 may be non-activated.

As shown in FIG. 12C, the display device DD' may be folded to be in the out-folding state. Here, the out-folding state may refer to a state in which at least a portion of the display region DA' is folded to be located at the outside of the folded display device DD'. When the display device DD' is in the out-folding state, the user can view at least a portion of the display region DA'.

In this case, at least one of the first to third display regions DA1, DA2, and DA3 may be non-activated.

Figure 13:
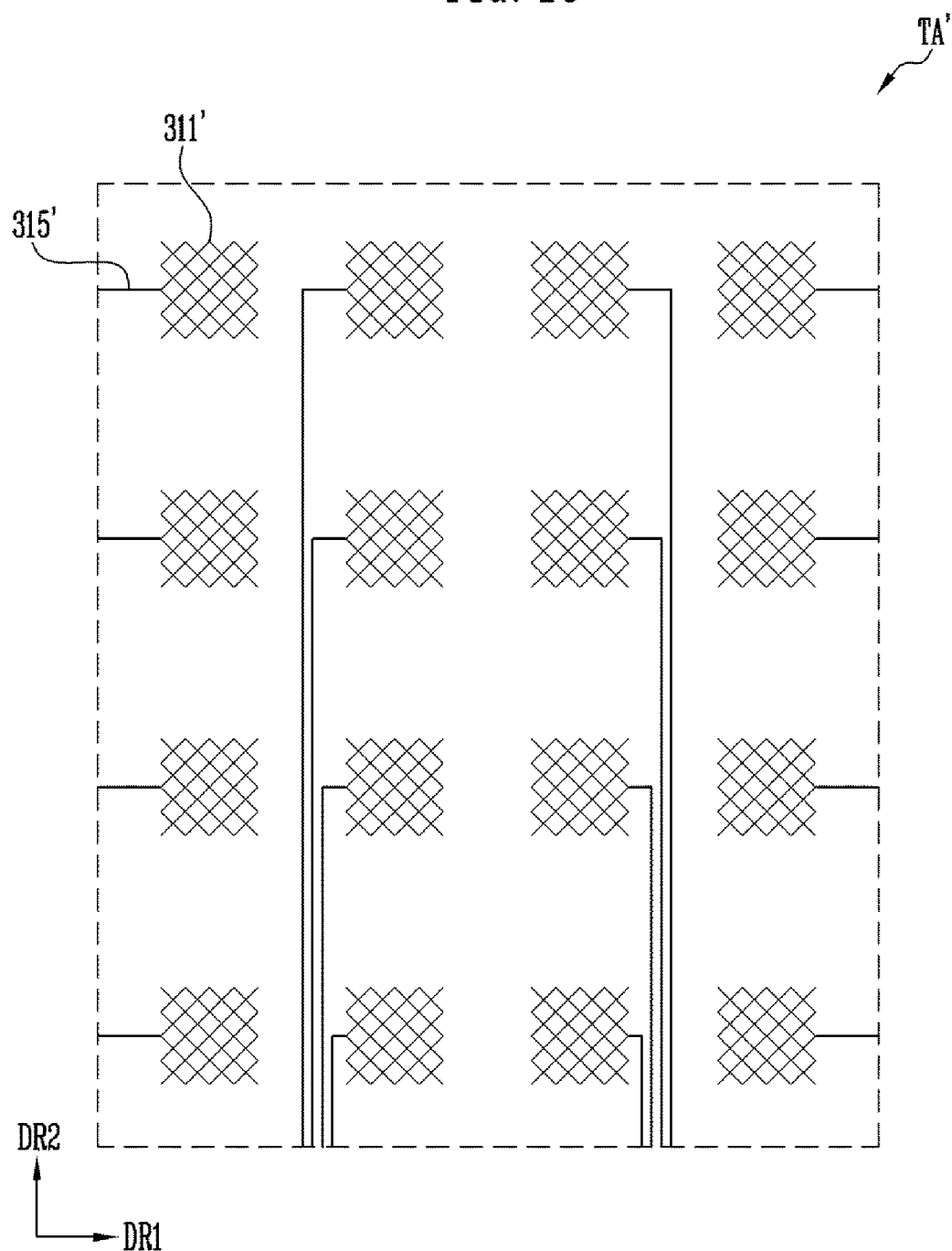
FIG. 13 is a plan view illustrating the structure of a touch active region of a display device according to some example embodiments of the present disclosure.

FIG. 13 is a plan view illustrating the touch active region of a display device according to some example embodiments of the present disclosure.

In FIG. 13, descriptions of portions overlapping with those of the above-described embodiment will be omitted. That is, descriptions of components such as the second sensor 320 and the pads TP1 and TP2, which are provided in the touch non-active region NTA as shown in FIG. 6B or 11, will be omitted, and the shape of a first sensing electrode 311' will be mainly described.

Referring to FIG. 13, a plurality of first sensors 311' and 315' may be provided in the touch active region TA'. The first sensors 311' and 315' are arranged on a plane defined by a first direction DR1 and a second direction DR2, and the form in which the first sensors 311' and 315' are arranged may be a matrix form in which the first sensors 311' and 315' are arranged along the first direction DR1, and a plurality of sensor rows on which the first sensors 311' and 315' are arranged along the first direction DR1 are provided along the second direction DR2.

Each of the plurality of first sensors 311' and 315' may include a first sensing electrode 311' and a signal line 315' for transferring a touch input signal Ts acquired by the first sensing electrode 311' to the sensor controller TSC.

The first sensing electrode 311' may have a mesh shape. For example, as shown in FIG. 13, the first sensing electrode 311' may be configured with conductive lines forming openings. The conductive lines may be provided in a single layer or a multi-layer.

The conductive lines may include a conductive material. For example, the conductive material may include metals, alloys thereof, a conductive polymer, a conductive metal oxide, and the like.

In an embodiment of the present disclosure, examples of the metals may be copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, lead, and the like. Examples of the conductive polymer may be polythiophene-based, polypyrrole-based, polyaniline-based, polyacetylene-based, and polyphenylene-based compounds, mixtures thereof, and the like. In particular, a PEDOT/PSS compound among the polythiophene-based compounds may be used as the conductive polymer.

Examples of the conductive metal oxide may be indium tin oxide (ITO), indium zinc oxide (IZO), antimony zinc oxide (AZO), indium tin zinc oxide (ITZO), zinc oxide (ZnO), tin oxide ($SnO_2$), and the like.

According to some example embodiments of the present disclosure, it is possible to provide a display device for controlling on or off of a power source by sensing a folding state of the display device.

Further, according to some example embodiments of the present disclosure, it is possible to provide a foldable display device in which a sensor for sensing a folding state of the display device is formed without adding any separate component or any separate process.

Aspects of some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A display device foldable along a folding axis, the display device comprising:
    a display panel configured to display an image at a display region; and
    a touch unit configured to sense a touch input at the display region, and sense a folding state of the display device,
    wherein the touch unit comprises:
    a plurality of first sensors arranged in a matrix on a same plane and overlapping the display region at a touch active region; and
    a second sensor overlapping the folding axis at a touch non-active region outside of the touch active region, the second sensor comprising a conductive line, wherein a first end of the conductive line is connected to a first pad at the touch non-active region and extends to the folding axis where at least a portion of the conductive line is bent and extends, from the at least the portion of the conductive line that is bent in the touch non-active region, to a second pad adjacent the first pad in the touch non-active region without passing through the touch active region.

2. The display device of claim 1, wherein the display device is divided into the display region and a non-display region surrounding the display region,
    wherein the plurality of first sensors overlap the display region, and the second sensor overlaps the non-display region.

3. The display device of claim 2, wherein each of the plurality of first sensors comprises:
    a sensing electrode; and
    a signal line connected to the sensing electrode,
    wherein the sensing electrode and the signal line are on a same plane.

4. The display device of claim 3, wherein the touch unit further comprises a first pad connected to the signal line.

5. The display device of claim 4, wherein the second sensor is on a same plane as the first pad.

6. The display device of claim 5, wherein the second sensor is on a plane different from the plane of the plurality of first sensors.

7. The display device of claim 3, wherein a resistance of the second sensor is larger than a resistance of the plurality of first sensors.

8. The display device of claim 3, wherein the touch unit further comprises a sensor controller configured to receive a touch input signal from the plurality of first sensors, and receive a folding sensing signal from the second sensor,
    wherein the touch input signal comprises a change in self-capacitance of the sensing electrode, and the folding sensing signal comprises a change in resistance of the second sensor.

9. The display device of claim 3, wherein the sensing electrode has a mesh shape.

10. The display device of claim 2, wherein two second sensors are provided in the touch unit,
    wherein the display region is between the two second sensors.

11. The display device of claim 1, further comprising a display driver configured to control display of an image on the display panel, corresponding to a signal output from the second sensor.

12. The display device of claim 11, wherein the display region comprises a first display region divided from a second display region by the folding axis,
    wherein, when the display device is in an in-folding state, the display driver is configured to control the first display region and the second display region to be non-activated.

13. The display device of claim 12, wherein, when the display device is in an out-folding state, the display driver is configured to control at least one of the first display region and the second display region to be non-activated.

14. A method for driving a display device foldable along a folding axis, the method comprising:
- displaying an image on a display panel;
- acquiring a folding sensing signal from a second sensor in a touch unit; and
- controlling display of an image on the display panel with reference to the folding sensing signal,
- wherein the second sensor comprises a conductive line, wherein a first end of the conductive line is connected to a first pad at a touch non-active region and extends to the folding axis where at least a portion of the conductive line is bent and extends from the at least the portion of the conductive line that is bent in the touch non-active region to a second pad adjacent the first pad in the touch non-active region without passing through a touch active region,
- wherein the folding sensing signal comprises a change in resistance of the second sensor.

15. The method of claim 14, wherein the display panel is configured to display the image through a plurality of display regions divided by the folding axis, and
the displaying of the image on the display panel is controlled such that the plurality of display regions are non-activated when the display device is in an in-folding state.

16. The method of claim 15, wherein the displaying of the image on the display panel is controlled such that at least one display region among the plurality of display regions are non-activated when the display device is in an out-folding state.

17. The method of claim 14, wherein the touch unit comprises:
- a plurality of sensing electrodes arranged in a matrix on a same plane;
- a plurality of signal lines respectively connected to the plurality of sensing electrodes; and
- a plurality of pads respectively connected to the plurality of signal lines,
- wherein the plurality of sensing electrodes output a touch input signal to which a change in self-capacitance is reflected.

18. The method of claim 17, wherein the plurality of sensing electrodes and the plurality of signal lines are formed on the same plane.

19. The method of claim 18, wherein the plurality of pads are formed in a plane different from that of the plurality of sensing electrode, and
the second sensor and the plurality of pads are formed on a same plane.

* * * * *